(12) United States Patent
Temerinac

(10) Patent No.: US 6,477,215 B1
(45) Date of Patent: Nov. 5, 2002

(54) SAMPLING CONTROL LOOP FOR A RECEIVER FOR DIGITALLY TRANSMITTED SIGNALS

(75) Inventor: Miodrag Temerinac, Gundelfingen (DE)

(73) Assignee: Micronas Intermetall GmbH, Freiburg (DE)

( * ) Notice: Subject to any disclaimer, the term of this patent is extended or adjusted under 35 U.S.C. 154(b) by 0 days.

(21) Appl. No.: 09/160,313

(22) Filed: Sep. 25, 1998

(30) Foreign Application Priority Data

Sep. 26, 1997 (EP) .............................. 97116754

(51) Int. Cl.[7] .............................. H04L 7/00
(52) U.S. Cl. .............................. 375/355
(58) Field of Search .............................. 375/355, 326, 375/377, 316, 324, 340; 327/291; 328/72

(56) References Cited

U.S. PATENT DOCUMENTS 4,827,515 A * 5/1989 Reich
4,896,334 A * 1/1990 Sayar
5,862,191 A * 1/1999 Moridi

* cited by examiner

Primary Examiner—Jean Corrielus
(74) Attorney, Agent, or Firm—Duane Morris LLP

(57) ABSTRACT

To optimize the sampling of individual symbols (S0 to S3), a sampling control loop (1) for a circuit (2) for receiving digitally transmitted signals (s) is connected to a timing error detector (3) which determines the respective timing error values (td). To improve the control action of the sampling control loop (1), an evaluating device (11) determines a reliability value (v) from signals (I, Q; Is, Qs; sb, sp; sr) of the receiving circuit (2) and controls the sampling control loop (1) in accordance with the reliability value (v).

7 Claims, 4 Drawing Sheets

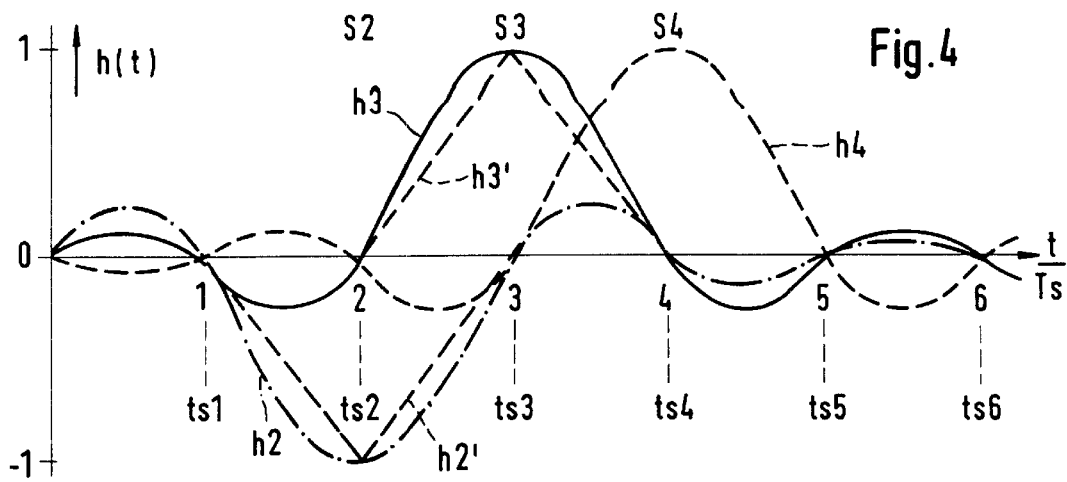
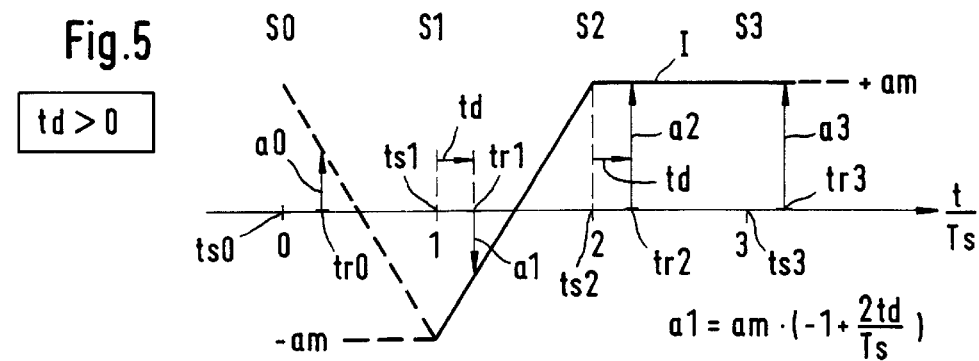
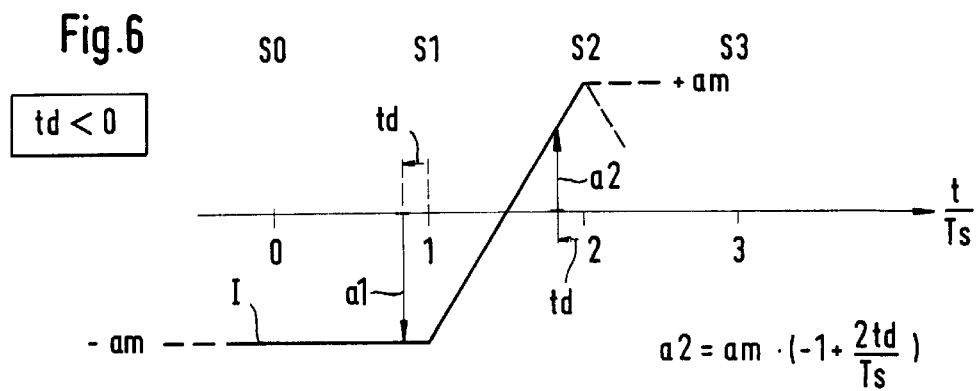

SAMPLING CONTROL LOOP FOR A RECEIVER FOR DIGITALLY TRANSMITTED SIGNALS

FIELD OF INVENTION

This invention relates to a sampling control loop for a receiver for digitally transmitted signals which are transmitted as symbols by quadrature modulation.

BACKGROUND OF INVENTION

Such transmission methods are known by the following abbreviations: FSK (=Frequency Shift Keying), PSK (=Phase Shift Keying), BPSK (=Binary Phase Shift Keying), QPSK (=Quadrature Phase Shift Keying), and QAM (=Quadrature Amplitude Modulation). The receiver circuits for these methods are known in the art and, as a rule, are similar in construction. An important constituent is the analog or digital sampling control loop, which ensures that the information of the digitally transmitted signals is sampled at the correct instant. The optimum sampling of these signals is temporally closely connected with the symbols of the transmitted data stream and is independent of whether the processing at the receiver end is analog or digital.

If the processing is digital, the digitization rate must, of course, be at least as high as the data rate of the transmitted symbols. As a rule, the digitization rate is well above this value, e.g., by at least one order of magnitude, with the digitization rate being free-running or locked to the symbols rate.

In an article by Floyd M. Gardner, "A BPSK/QPSK Timing-Error Detector for Sampled Receivers", IEEE Transactions on Communications, Vol. COM-34, No. 5, May 1986, pages 423 to 429, it is described in detail how to timing errors can be determined from the respective symbols. To eliminate these timing errors, use is made of a sampling control loop, which is not described in detail. This control loop includes a timing error detector and a timing error corrector whose output is fed back to the sampling stage.

WO 96/11526 discloses a sampling control loop for a circuit for receiving digitally transmitted signals in which the digitization takes place after the quadrature demodulator by means of two analog-to-digital converters. The control loop changes the frequency and phase of the digitization clock, whereby the sampling instants for the symbols are optimally adjusted.

WO 96/17459 discloses a sampling control loop for a circuit for receiving digitally transmitted signals in which the digitization takes place before the quadrature demodulation. The digitization rate is independent of the rate and phase of the received symbols. In this embodiment, the optimum sampling instant for the respective symbol is formed by a digital interpolation circuit ("digital resampler").

The known advantages of digital coding and transmission by means of symbols are that the transmission path and the receiver contribute no additional interference or noise to the signal content as long as the symbols are reliably recognized at the receiver end. The recognizability of the individual symbols is impaired by superimposed interference and noise signals which blur the originally punctiform symbol location in the vector diagram into an areal phase and amplitude range. If, in addition, the sampling instant for the individual symbols differs from the nominal value, reliable symbol recognition is no longer ensured under unfavorable receiving conditions.

The above disadvantages in the reception or evaluation of digitally transmitted signals relate to operating conditions which are no longer worthy of reception for conventional receiver circuits. Starting from this prior art, it is object of the invention to make the receiving circuit even less sensitive to interference.

SUMMARY OF INVENTION

A sampling control loop for a receiving circuit for receiving digitally transmitted signals, including a timing error detector for determining respective timing error values by which current symbol sampling instants differ from optimum symbol sampling instants given by the Nyquist criterion, wherein the timing error detector comprises an evaluating device coupled thereto which determines a reliability value from signals of the receiving circuit and controls the sampling control loop in accordance with the reliability value.

BRIEF DESCRIPTION OF FIGURES

FIG. 4 shows three transfer functions;

FIG. 5 shows the schematic waveform of a quadrature signal component;

FIG. 6 shows a linear calculation of the timing error value;

DETAILED DESCRIPTION OF INVENTION

Figure 1:
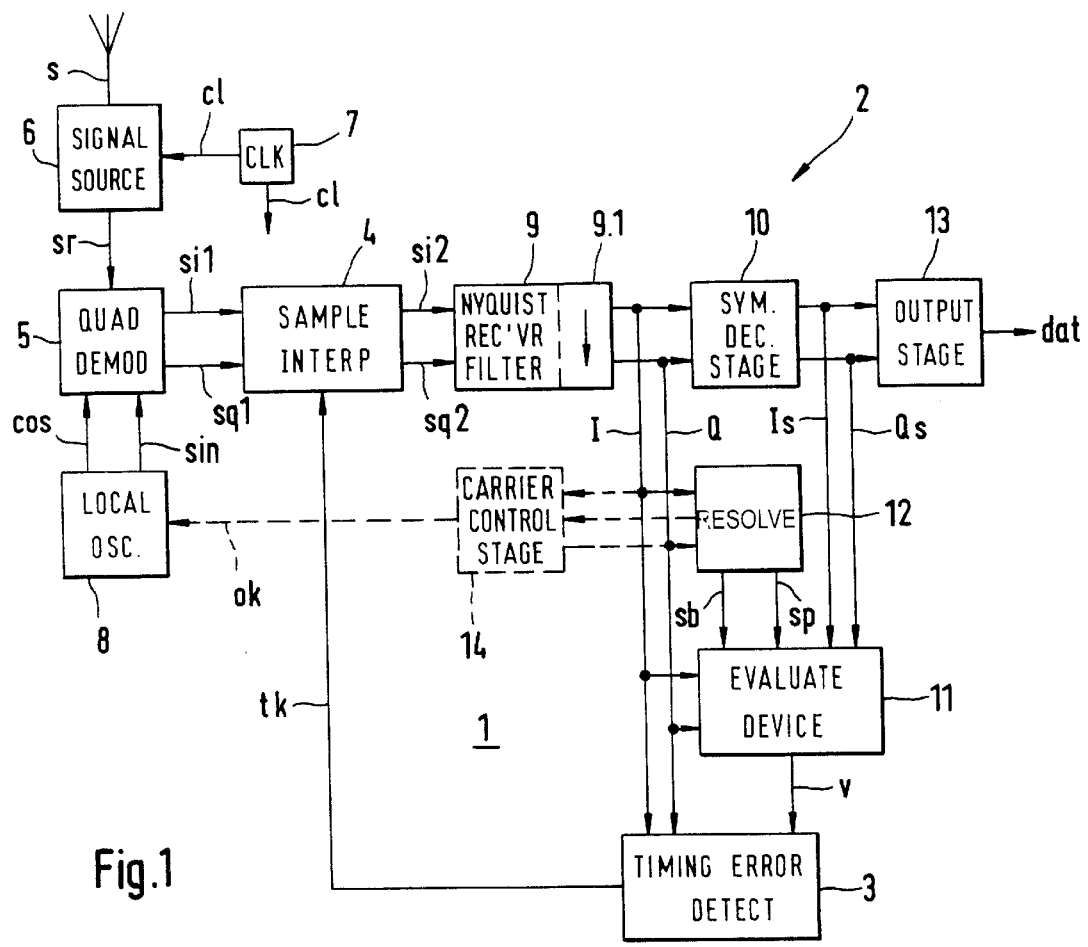
FIG. 1 is a schematic block diagram of a sampling control loop in accordance with the invention.

This object is attained by coupling the sampling control loop of the receiving circuit with an evaluating device which determines from the available signals a reliability value for the respective timing error value measured in a timing error detector, and which influences the sampling control loop in accordance with the reliability value determined.

The invention is predicated on recognition that in the presence of severely disturbed signals, the tracking of the sampling control loop is already disturbed considerably by occasionally incorrectly determined timing error values, which ultimately increases the number of incorrectly recognized symbols. In the presence of severely disturbed signals, the sampling control loop responds much too sensitively or even in the wrong direction. The introduction of a reliability value allows the sampling control loop to be controlled adaptively in accordance with the respective signal state. To accomplish this, at small reliability values, the sampling control loop is made less sensitive as a whole or for given frequency components, or its control time constant is adapted in a suitable manner. In this way, the incorrectly determined timing error values are not suppressed, but on a time average, their contribution is reduced.

Particularly effective is nonlinear processing, e.g., by attenuation or blanking, in which the presumably incorrectly determined timing error values influence the sampling control loop only very slightly or not at all. This involves processing the timing error values on an individual basis, the processing being dependent on the respective reliability value. This individual attenuation, weighting, or blanking has the advantage that the disturbances, which occur singly or as bursts, do not interfere with the condition under control. Under normal receiving conditions, neither the control slope nor the control rate of the sampling control loop is changed by these measures.

To determine the reliability value, characteristic signal changes which result from the interference are evaluated. As mentioned above, the location in the vector diagram for the symbol spreads in both the phase direction and the amplitude direction. The measured phase and amplitude error values can represent a measure of the respective reliability. The smaller the error values, the greater the reliability and the smaller the probability that the timing error value is determined incorrectly. Analogously, the reliability can be determined from the quadrature signal components and their deviations from the nominal value. To improve the receiving conditions in the presence of signals of poor quality, it suffices to determine the reliability value relatively coarsely, e.g., by presetting thresholds for the measured error values.

It is also possible, of course, to form the reliability value with much more complex circuitry or in another manner, e.g., by evaluating interference-dependent variations in the demodulated or still undemodulated signal. By means of filter circuits, the determination can be limited to frequency ranges which are largely independent of the modulation. The reliability value can also be determined from signals which were converted or transformed in some form or other. This can be done, for example, by means of a resolver which converts the quadrature-modulated signals of the receiving circuit to signals with polar coordinates, which are then evaluated separately according to magnitude and phase. Via the respective error value, the reliability value can also be determined as a weighting factor. The weighting may be divided into individual steps with associated threshold values. In the limiting case, the reliable range is determined with a single threshold value or with a threshold-value window. This corresponds to a digital yes/no reliability value.

The determination of the reliability value becomes particularly simple if the transmission of the individual symbols or their associated in-phase or quadrature components (hereinafter also referred to as "I components" and "Q components") takes place according to the Nyquist criterion, which is usually the case.

Each symbol or bit to be transmitted is assigned a transfer function which has a positive or negative signal value at the respective symbol sampling instant, and the signal value "zero" at all other integral multiples of the symbol period. The signal state in the intermediate time ranges is different from zero, but the envelope is to go to zero as rapidly as possible at intervals of a few symbol periods. By this condition, intersymbol interference is prevented if the sampling occurs precisely at the intended symbol sampling instants. With the timing error detector, the time difference between the current symbol sampling instant and the optimum symbol sampling instant is determined.

The use of the Nyquist criterion for determining the reliability value is based on the time behavior of the transfer function. Only those timing error values are permitted for the sampling control loop which are associated with a change of the sign of the respective I or Q component. The timing error value can be meaningfully determined only from the time-dependent signal change of the sample values on a change of sign. Apparent timing error values which are based on signal differences that are caused only by disturbed signals and not by a genuine change of sign are thus suppressed.

A simple circuit for determining the sign change of the sampled I or Q component is constituted by an exclusive-OR gate whose first and second inputs are fed by the sign bit directly and with a delay of one symbol period, respectively.

A further improvement in the formation of the reliability value is achieved by storing in a storage device a signal sequence which contains either quadrature signal components or recognized symbol components or other signals of the receiving circuit. Since the stored analog or digital signal sequence, whose range is defined by a tracking window interval, covers a major signal range, more elaborate analyses can be carried out to determine the reliability value.

If the tracking window interval extends over the time range of at least four successive symbols or the associated real sample values, a very effective reliability value can be determined by a simple logic operation. The logic operation implies that the reliability value is considered sufficient only if the timing error value is temporally associated with a sign change of the stored signal sequence. In the case of digitized samples, only the sign bit needs to be checked to detect the sign change. With the evaluation of the sign change alone, a certain improvement can already be observed in the action of the sampling control loop.

An additional criterion for the reliability value relates to the determination of a reference signal amplitude. The latter serves as a reference quantity for the signal value in the sign-change range. The respective timing error value can be determined from the time-dependent change of the signal value in comparison with the reference signal amplitude, in the simplest case by approximation using a simple linear relation. However, the timing error value so determined can only be considered to be reliable if the stored signal sequence is logically stable at least at the two sampling instants which serve to determine the reference signal amplitude. With the linear approximation assumed, it is irrelevant whether the sample values for the reference signal amplitude precede or follow the sign change. This only has an influence on the selection and mathematical combination of the respective sample values.

If the reliability value corresponds to a digital signal with one bit, the transfer of the timing error value into the sampling control loop is inhibited by means of a logical blocking device controlled by the reliability value, e.g., by means of a gate circuit. The formation of the reliability value from the stored signal sequence may be readily combined with an analog sampling control loop.

By taking suitable measures, the timing error correction value for the sampling interpolator is limited in the positive and negative directions to half a sampling period. If the timing error correction value exceeds this limit, the timing error correction will be related to the neighboring, closer sample value, with the sign of the timing error correction value changing. In an all-digital implementation, the sampling period relates to the real sample values which are determined by the digitization. In order that two interpolated sample values can never occur in a real sampling interval, which would result in a conflict in the unique association between the calculated timing error correction values and the real sample values, the number of real sample values determined by the digitization is advantageously chosen to be greater than the number of interpolated sample values. In that case, a real sample value is skipped whenever the timing error correction value would become greater than half the sampling period. As in a modulo function, the timing error correction value changes to a negative value, which then continuously approaches the positive limit value again. This establishes a unique association between calculated timing error correction values and the real sample values. The difference between the digitization rate and the interpolation rate must be greater than all worst-case tolerances of the symbol and clock frequencies at the transmitter and receiver ends.

The invention and further advantageous aspects thereof will now be explained in greater detail with reference to the accompanying drawings, in which FIG. 1 shows, as one embodiment of the invention, a sampling control loop 1 which is incorporated in a circuit 2 for receiving digitally transmitted signals s. A timing error detector 3 forms from signals of the receiving circuit, particularly from the quadrature signal components I, Q, a timing error value td, from which it derives, by means of filters, a timing error correction value tk which controls a sampling interpolator 4 inserted in the signal path of the receiving circuit 2. The sampling interpolator is fed by a pair of quadrature signal components si1, sq1 from a quadrature demodulator 5 which converts a quadrature-modulated input signal sr into the baseband or a low frequency. In the embodiment of the receiving circuit 2 of FIG. 1, the signal sr applied to the quadrature demodulator 5 is a digitized signal which was digitized in a preceding signal source 6 in accordance with a system clock cl provided by an internal or external system clock generator 7. The source 6 may be a tuner which receives the digitally modulated signal s via an antenna, but it may also be a memory device or a cable station or any other device, in which case it is suitably adapted. In the digital implementation of the receiving circuit 2 of FIG. 1, both the quadrature mixing and the interpolation in the sampling interpolator 4 are also controlled by the system clock cl. For the digital quadrature mixing, a local oscillator 8 supplies the quadrature demodulator 5 with digital signals whose digital values correspond to a cosine signal cos and a sine signal sin.

The sampling interpolator 4 provides an interpolated pair of quadrature signal components si2, sq2, which is fed to a Nyquist receiver filter 9. This filter 9 cooperates with a Nyquist filter at the transmitter end (not shown) and determines the aforementioned transfer function, see also FIG. 4. The Nyquist receiver filter 9 is, as a rule, followed by a decimation stage 9.1, in which the processing rate is reduced as far as possible, ideally to the symbol rate. The output of the Nyquist receiver filter 9 or the subsequent decimation stage 9.1 is thus also a pair of quadrature signal components I, Q, which is fed to a symbol decision stage 10, to the timing error detector 3, and to an evaluating device 11 which determines a reliability value v from these quadrature signal components and/or further signals.

In the embodiment of FIG. 1, the quadrature signal components I, Q are also applied to a resolver 12 which converts them into a pair of signal components sb, sp with polar coordinates b, φ, and which feeds at least one of these signals sb, sp to the evaluating device 11. During the evaluation of these signals I, Q, sb, sp for forming the reliability value v, the sign and the magnitude are important, because permissible deviations from the respective nominal value can then be determined simply by presetting switching thresholds k1 to k7.

The determination of the reliability value v is even simpler if symbol components, namely the output signals Qs, Is from the symbol decision stage 10, are used in the evaluating device 11. These signals contain only the sign of the respective quadrature signal component I, Q. In the case of QPSK modulation, each pair of symbol components Is, Qs defines one out of four different symbols. The separation of the individual symbols into an output data stream dat, by which the original digital signals s are reconstructed, takes place in an output stage 13. The symbol components Is, Qs are actually assigned to the optimum symbol sampling instants ts0, etc.

The symbol components Is, Qs are evaluated in the evaluating device 11 solely via the stored sequence of signs. Evaluation via the magnitude, as in the case of the other signals, is not necessary. of course, the reliability value v may also be formed by a combination of all these methods in which each evaluating method determines at least one sufficient reliability value v. If one of the reliability values does not suffice, the measured timing error value td is questionable and should not be fed into the sampling control loop 1.

For the sake of completeness, the feedback path for the correct carrier frequency in the quadrature demodulator 5 is also indicated in the receiving circuit 2. It contains a carrier control stage 14 which is fed either by the quadrature signal components I, Q or by an output signal sb, sp from the resolver 12. An oscillator control signal ok from the carrier control stage 14 controls the frequency of the local oscillator 8, in this embodiment a digital oscillator whose output signals cos, sin may be formed via a stored table.

Figure 2:
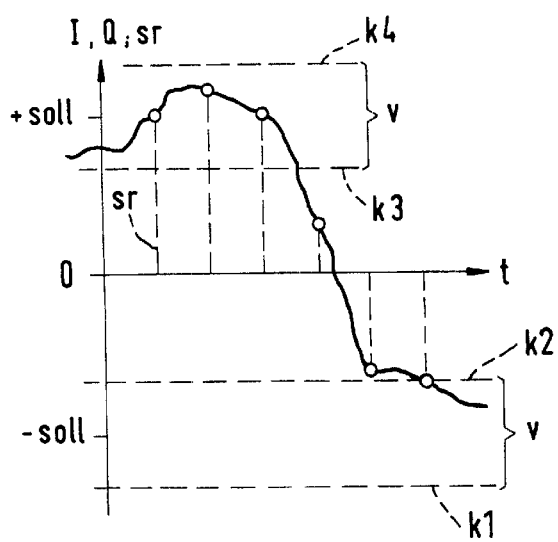
FIG. 2 shows the waveform of a quadrature signal component.

FIG. 2 shows, by way of example, the waveform of an in-phase component I or a quadrature component Q in the range of a change of sign. The associated digital sample values are indicated by dashed lines and small circles, but this could also be other sample values sr of the receiving circuit 2. Due to noise and disturbing effects, the quadrature signal components I, Q deviate from the positive or negative nominal value. The reliable signal ranges, which define the reliability value, are limited by the threshold values k1, k2 and k3, k4, respectively. Small quadrature signal components I, Q are particularly critical, so that the inner threshold values k2, k3 are of greater importance, while the outer threshold values k1, k4 may possibly even be omitted. When the quadrature signal components I, Q have been transformed into polar coordinates b, φ by means of the resolver 12, the respective signal value is present as an absolute value sb and a phase value sp. The greater the noise or interfering component, the greater the deviation from the desired absolute value $b_{soll}$ and the desired phase value $_{soll}\phi$. By presetting threshold values k6, k7, and k5, the reliable ranges can be separated from the unreliable ones in a simple manner to determine the reliability value v.

Figure 3:
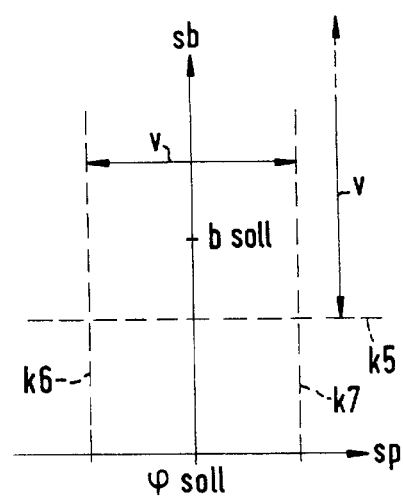
FIG. 3 is a schematic amplitude-phase diagram.
Figure 7A:
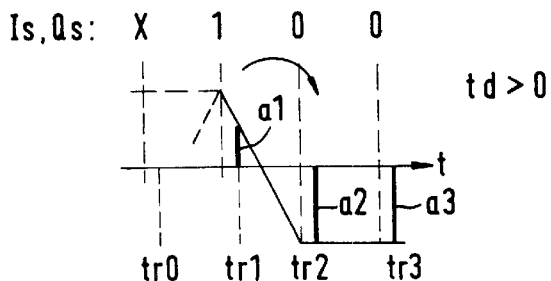
FIGS. 7A–7D show schematically four valid states for the reliability value.
Figure 7C:
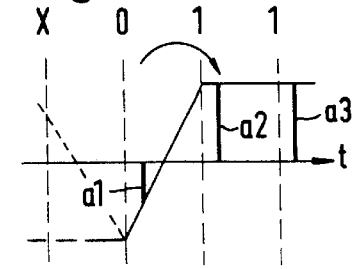
Figure 7B:
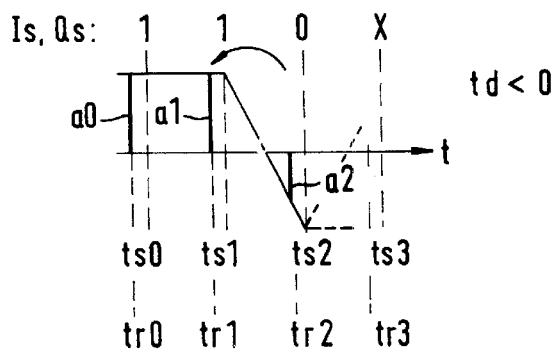
Figure 7D:
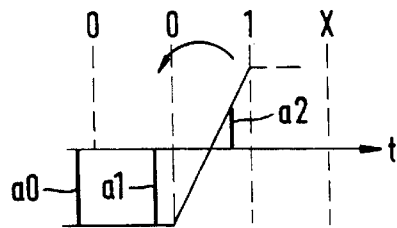
Figure 8A:
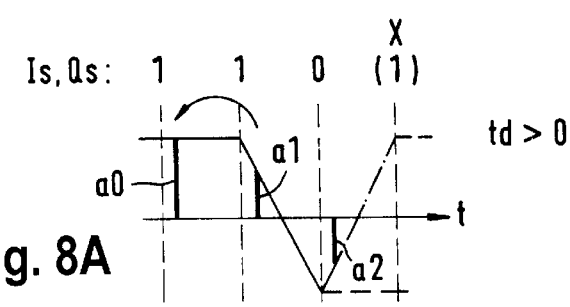
FIGS. 8A–8D show schematically four other valid states for the reliability value.
Figure 8C:
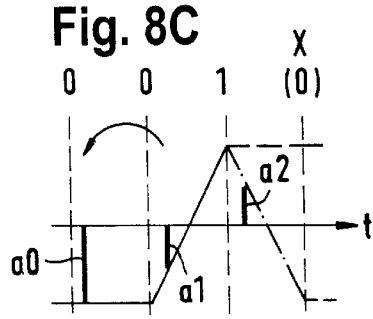
Figure 8B:
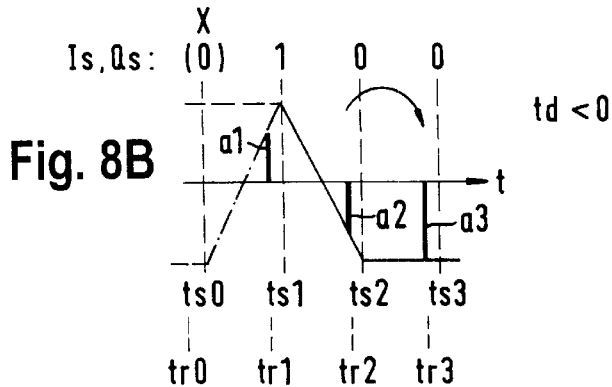
Figure 8D:
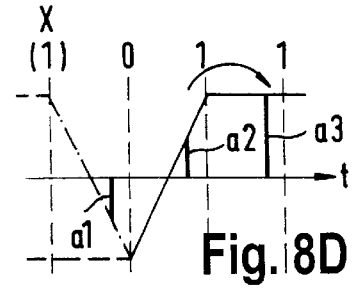

The threshold values in FIGS. 2 and 3, which control a yes/no decision, may, of course, be supplemented with further threshold values, so that different reliability levels are available and the respective reliability value v permits weighting.

FIG. 4 shows the theoretical transfer functions h(t) for one of the quadrature signal components I, Q of three successive symbols S2, S3, S4. The first transfer function h2 belongs to the symbol S2, which represents the logic 0 state at the symbol sampling instant ts2. The transfer function h3 of the symbol S3 shows the logic 1 state at the symbol sampling instant ts3. At the symbol sampling instant ts4, the transfer function h4 of the fourth symbol S4 also shows the logic 1 state. The individual transfer functions h2 to h4 satisfy the Nyquist criterion, which at the respective symbol sampling instants ts1 to ts6 permits the normalized signal values +1 and −1, which are assigned to the logic 1 state and 0 state, respectively, for only a single transfer function h(t). All other transfer functions h(t) pass through the signal value 0 at the symbol sampling instants. Between the symbol sampling instants ts1 to ts6, all transfer functions h(t) contribute to the signal, but the value of this contribution decreases with increasing distance to the associated symbol sampling instant.

From FIG. 4 it is apparent that the information on the respective symbol can be evaluated without interference from the neighboring symbols only at the symbol sampling instants. The farther the current symbol sampling instant is away from the neighboring optimum sampling instants, the greater the intersymbol interference. It should be noted that by "current symbol sampling instant", both actual sampling and interpolated sampling may be understood. In the case Of interpolated sampling, the sample value is only present as a quantity which is calculated from adjacent actual sample values si1, sq1.

To determine the timing error value td from the I component and/or Q component, the transfer functions h(t) shown in FIG. 4 are replaced by easy-to-compute approximation functions. The approximation function corresponding to the transfer function h3, for example, is the function h3', which rises linearly to the value +1 between the symbol sampling instants ts2 and ts4 and then falls off linearly. Outside this time range, the transfer function h3' has the value 0 everywhere, also between the symbol sampling instants. For the logic 0 state to be transmitted, a negative-going approximation function is used, cf. the course of the transfer function h2' in comparison with the transfer function h2. Outside the symbol sampling values ts1 to ts3, the approximation function h2', too, has the value 0. At the symbol sampling point ts2, the normalized signal level −1 is reached.

The calculation of the timing error value td becomes simpler if the individual quadrature components I, Q are composed of such approximation functions. This is illustrated by way of example in FIGS. 5 and 6.

These figures show the approximate variation of one of the quadrature signal components I, Q at the transition from a negative signal level −am to a positive signal level +am, which correspond to the logic 0 state and 1 state, respectively. The optimum signal state of the symbols S0 to S3 should be sampled at the sampling instants ts0 to ts3. If the current sampling does not coincide with the optimum symbol sampling instants, the measured signal amplitudes a0 to a3 will differ from the maximum value am if the current symbol sampling instant falls within the range of a change of state. The current symbol sampling instants are designated in FIG. 5 by tr0, tr1, and tr2. In FIG. 6, which is similar to FIG. 5, the designations of the sampling instants have been omitted for the sake of clarity.

In FIG. 5, the time axis t points to the right. The current or real symbol sampling instants tr0 to tr2 are shifted with respect to the optimum symbol sampling instants ts0 to ts3 to the right, toward greater time values. The timing error value td is therefore positive. If the signal state does not change between two symbol sampling instants ts2, ts3, the signal amplitude sampled between the instants, a2, will not change, either. Such a signal amplitude a2 can therefore serve as a reference for the nominal amplitude +am or −am. Through the sectioned linearization of the transfer function h(t), the timing error value td can be determined from the measured signal amplitude a1 in comparison with the reference signal amplitude a2 and the known symbol period Ts. The following linear relationship holds:

$$a1 = a2 - 2 \times a2 \times td/Ts = am \times (-1 + 2 \times td/Ts) \qquad (1)$$

A comparison of the two equal signal amplitudes a0, a1 provides no information on the timing error value td, since both signal amplitudes are assigned to one change of sign. Thus, only the determination of the timing error value td from a comparison of the signal amplitudes a2 and a1 is reliable. These, however, are linked with the states of the symbols S1, S2, S3, while the state of the symbol S0 is of no significance.

FIG. 6 shows a comparable signal change, with the associated timing error value td being negative, however. Because of the shift of the current sampling instants tr0 to tr3 in the negative direction, a statement about the maximum signal amplitude +am is possible only if the signal amplitude a1 is logically stable between the optimum symbol sampling instants ts0 and ts1, and thus between the real sampling instants tr0 and tr1. Consequently, when checking whether the signal amplitude is suitable for use as a reference, a change of sign must not occur between the signal amplitudes a0 and a1, while magnitude differences are neglected. The timing error value td can then be calculated from the measured signal amplitudes a1, a2 and the symbol sampling period Ts by the following equation:

$$a2 = -a1 + 2 \times a1 \times td/Ts = am \times (-1 + 2 \times td/Ts) \qquad (2)$$

From FIG. 6 it can be seen that for negative timing error values td, the signal waveform at the symbol sampling instants ts0, ts1, and ts2 must be stored and evaluated, while the state at the symbol sampling instant ts3 is arbitrary. It is therefore appropriate to store four adjacent symbol components Is and/or Qs in a memory circuit, and to use the first three or last three stored states for the evaluation, depending on the sign of the timing error value. If the stored signal sequence matches the timing error value determined, the measurement is reliable; in all other cases, it is unreliable. The reliability value v in this case is a simple yes/no signal.

The two equations (1) and (2) can be easily solved for td. The corresponding calculation can be readily implemented in an on-chip computing circuit or by means of a subprogram. It is somewhat disturbing that the two calculations and the logic check with the four stored states must be performed in parallel. However, using the sign function sign (a2) of the measured signal amplitude a2, the two different equations can be transformed into a single equation (3):

$$f(td) = \text{sign}(a2) \times (a1 + a2) \qquad (3)$$

$$= +1 \times (-am + am \times (-1 + 2 \times td/Ts)) \qquad (4)$$

$$= 2 \times am \times td/Ts \qquad (5)$$

Solving equation (5) for td yields the correct result for the timing error value td.

It should be noted that the right-hand sides of equations (1) and (2) each include the factor "am" and are identical, with the factor "am" corresponding to the unsigned value of the reference signal amplitude. Whether this unsigned value "am" is sampled before or after the change of sign is unimportant for the calculation of the resultant timing error value td. If necessary, the equations for determining the timing error value td from two of the measured signal amplitudes a1, a2 have to be adapted. In any case it must be ensured that the associated symbol components Is, Qs are logically stable in the determination range of the respective reference signal amplitude a0, a1, a2, or a3, as shown in FIGS. 7A–7D and 8A–8D.

FIGS. 7A–7D show schematically the four states for a valid reliability value v, which are combinable in equation (3) in a simple manner. At the symbol sampling instants ts0 to ts3 or the associated sampling instants tr0 to tr3, the logic 0 and 1 states of the respective symbol component Is or Qs are shown. The symbol "X" means that the associated logic state is of no significance; it does not participate in the logical evaluation.

The evaluating circuit first establishes that the adjacent signal amplitudes a1 and a2 are of unlike sign, and determines a preliminary timing error value from the signal difference. Whether this value is reliable depends on whether the assumed reference signal amplitude—it is the greater of the two values—is actually such an amplitude. This can only be determined by comparing the sign with the adjacent current sample value a0 or a3. A change of sign must not occur during this determination, since the logic state of the symbol component Is, Qs is then certainly not stable in this range.

In the schematic representations of FIGS. 7A–7D and 8A–8D it is indicated by a bent arrow which of the two sample values a1, a2 is time-dependent and which is the reference signal amplitude. The arrowhead points to the reference signal amplitude, i.e., to the greater value, and the tail of the arrow points to the signal amplitude dependent on the timing error value td.

In the examples of FIGS. 8A–8D, a change of sign takes place between the sample values a1 and a2 in any case. It is possible, however, that neither of these two sample values is suitable for use as a reference amplitude because each of the two sample values a1 and a2 is assigned to a change of state of the symbol component Is, Qs. This is indicated in the examples of FIGS. 8A–8D by the signal waveform (cf. the dash-and-dot line) and the symbol components (0) or (1) in parentheses. Nevertheless, a valid timing error value td can be determined if a logically stable sample value in the neighborhood is available as a reference signal amplitude. That is the case in the four different symbol sequences shown in FIGS. 8A–8D. As the reference signal amplitude, the sample value a0 or a3 is selected, which is located between logically stable states, so that it is not dependent on the timing error value td. In the four examples given in FIGS. 8A–8D, the head of the bent arrow indicates the respective reference signal amplitude a0 or a3.

Sixteen (16) possible combinations correspond to the four storable symbol states Is, Qs. Four of them are considered reliable, as shown in FIGS. 7A–7D. The additional inclusion of the combinations of FIGS. 8A–8D increases the number of possible combinations, even though there may be overlaps with the combinations given in FIGS. 7A–7D.

Figure 9:
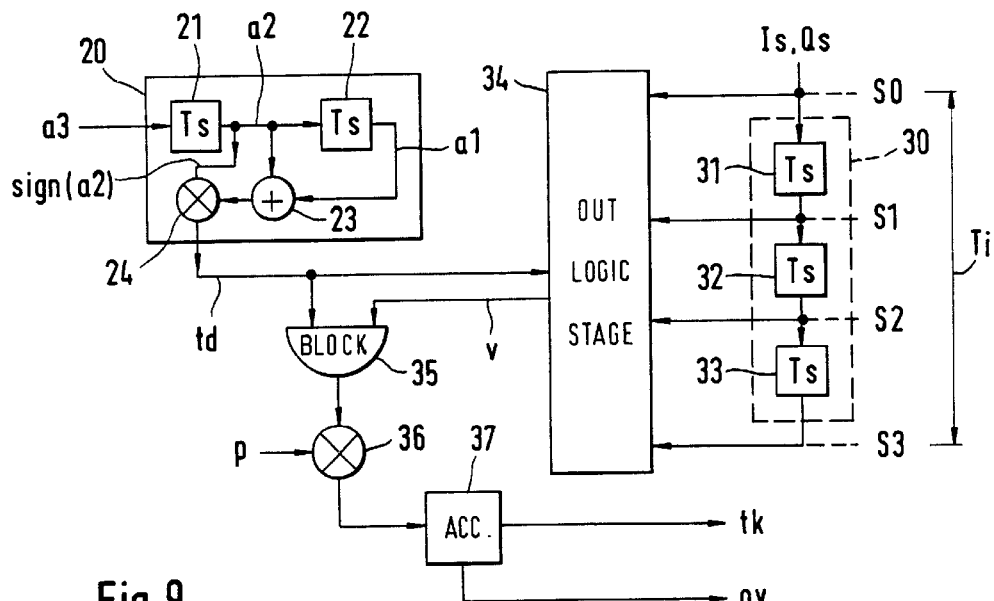
FIG. 9 is a block diagram of a circuit for forming a timing error correction signal.

FIG. 9 shows a block diagram of one embodiment of a computing circuit 20 according to equation (3) as part of the timing error detector 3 in connection with the evaluating device 11. The evaluating device 11 receives the detected symbol components Is, Qs. The computing circuit 20 receives the corresponding quadrature signal components I, Q as signal amplitudes a0 to a3. The input stage of the computing circuit 20 is a symbol delay stage 21, which receives the youngest signal amplitude a3. Its output delivers the signal amplitude a2, which is provided to a second symbol delay device 22 and to the first input of an adder 23. The output of the delay device 22 provides the signal amplitude a1, which is presented to the second input of the adder 23. A sign signal sign(a2) is coupled from the output of the symbol delay stage 21 and fed to the first input of a multiplier 24. The second input is fed by the output of the adder 23. The output of the multiplier 24 delivers the timing error value td according to equation (5), with a scale factor Ts/(2×am). If the computing circuit 20 is duplicated, the timing error value can be calculated from both quadrature signal components I, Q. Accordingly, the reliability value v must then also be formed from the two symbol components Is, Qs. By this measure, the number of valid timing error values td is approximately doubled, whereby the control of the sampling control loop 1 becomes even smoother.

In the simplest case, the evaluating device 11 comprises a storage device 30 which simultaneously makes available four successive symbol components Is or Qs, which correspond to the symbols S0 to S3. This storage is achieved by means of three series-connected symbol delay devices 31, 32, 33. The four taps of the storage device 30 are connected to a logic stage 34 which, using the sign of the timing error value td, performs a logic check according to FIGS. 7A–7D. The output of the logic stage 34 is the reliability value v, which controls a blocking device 35, in the example shown an AND gate for the timing error value td and the reliability value v. A multiplier 36 multiplies the output of the blocking device 35 by a numerical value p which is preset as a loop gain coefficient or can be adjusted via a control facility (not shown). The output of this multiplier 36 feeds an accumulator 37 which serves as an integrator in the control loop for the timing error value td. The output of the accumulator provides a timing error correction value tk, which is fed as a control value to the sampling interpolator 4. An overflow signal ov of the accumulator 37 serves to cause the sampling interpolator 4 to skip one of the real sample values si1, sq1 when an overflow occurs in the accumulator 37. This skipping is illustrated with the aid of FIG. 10.

Figure 10:
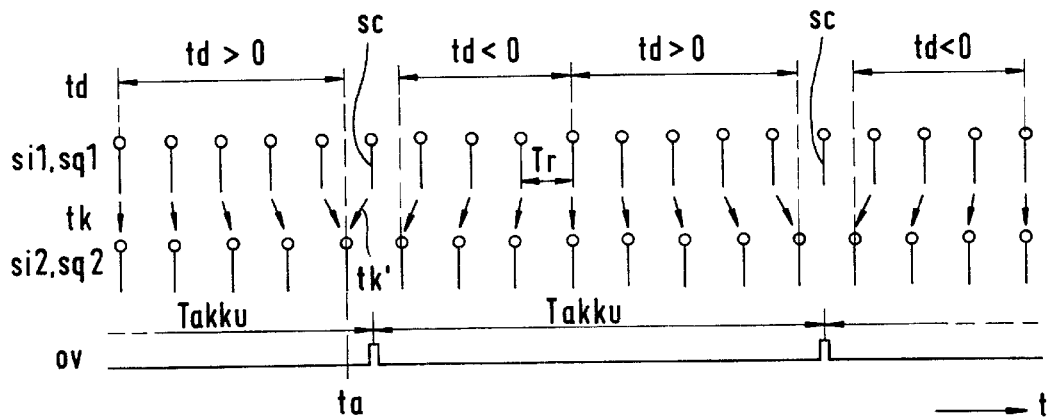
FIG. 10 shows the timing error correction signal at a free-running digitization clock frequency.

FIG. 10 shows real sample values si1, sq1 after the quadrature demodulator 5 in a schematic time diagram. The corresponding interpolated sample values si2, sq2 at the output of the sampling interpolator 4 are shown below the real sample values. The real sampling instants and the interpolating instants slide past each other. The respective timing error correction value tk is shown by an arrow which indicates the time difference from the actual sample value to the interpolated sample value. A first conflict for the interpolation may occur when two timing error correction values tk are obtained in a real sampling period Tr. This can be prevented by ensuring that the data rate applied to the sampling interpolator 4, which, as a rule, follows from the digitization rate, is greater than the interpolation rate. A second conflict may occur if an interpolated sample value si2, sq2 is assigned to two different timing error correction values tk and tk'. In the example shown, this could occur at the instant ta, at which the timing error correction value tk is approximately equal to half the value of the sampling period Tr. From this sampling instant ta at the latest, the timing error correction value tk should not be allowed to increase any further but should be related to the adjacent real sample value.

The second conflict can be prevented by a comparison of the two timing error correction values tk, tk' and a minimum decision. Both conflicts will resolve themselves, however, if the number of interpolated sample values si2, sq2 is greater than the number of real sample values si1, sq1, since a skip or ignore instruction can then be initiated for a real sample value si1, sq1 by an overflow signal ov from the accumulator 37 in the timing error detector 3. The overflow signal ov of the accumulator 37 is shown in the last line of FIG. 10. After each accumulator period $T_{akku}$, the next real sample value sc is skipped. In this manner, a unique association is achieved between the calculated timing error correction values tk and the real sample values si1, sq1.

It should be noted that the above-described functions of the invention and their further developments can be implemented with a monolithic integrable circuit. It is irrelevant whether individual functional units are implemented as a circuit or by means of a program in an on-chip processor. The amount of computation required by the invention described is very small, so that an existing processor can be readily employed.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. A sampling control loop (1) for a receiving circuit (2) for receiving digitally transmitted signals (s), comprising:
   a timing error detector (3) for determining respective timing error values (td) by which current symbol sampling instants (tr0 to tr3) differ from optimum symbol sampling instants (ts0 to ts3) given by the Nyquist criterion;
   an evaluating device (11) coupled to said timing error detector for determining at least one reliability value (v) from signals (I, Q; Is, Qs; sb, sp; sr) and controls the sampling loop (1) in accoplance with said at least one reliability value (v) when said at least one reliability value suffices; and
   a resolver (12) For converting quadrature-modulated signals (I, Q) of the receiving circuit (2) to signals (sb, sp) with polar coordinates (b, φ) and feeds at least one of said signals, sb, sp, to the evaluating device (11).

2. A sampling control loop (1) for a receiving circuit (2) for receiving digitally transmitted signals (s), comprising:
   a timing error detector (3) for determining respective timing error values (td) by which current symbol sampling instants (tr0 to tr3) differ from optimum symbol sampling instants (ts0 to ts3) given by the Nyquist criterion;
   an evaluating device (11) coupled to said timing error detector for determining at least one reliability value (v) from a signal sequence (I, Q; Is, Qs; sr) stored in a storage device (30), wherein the at least one reliability value (v) releases timing error value (td) for the sampling control loop (1) only if the timing error value (td) is temporally assigned to a sign change of the stored signal sequence (I, Q; Is, Qs, sr).

3. A sampling control loop (1) for a receiving circuit (2) for receiving digitally transmitted signals (s), comprising:
   a timing error detector (3) for determining respective timing error values (td) by which current symbol sampling instants (tr0 to tr3) differ from optimum symbol sampling instants (ts0 to ts3) given by the Nyquist criterion;
   an evaluating device (11) coupled to said timing error detector for determining at least one reliability value (v) from a signal sequence (I, Q; Is, Qs; sr) stored in a storage device (30), wherein the at least one reliability value (v) releases the timing error value (td) for the sampling control loop (1) only if the signal state of the stored signal sequence (I, Q; Is, QS, Sr) shows no sign change between at least two symbol sampling instants (ts0 to ts3) or associated current sampling instants (tr0 to tr3) which serve to select a reference signal amplitude (a0 to a3).

4. A sampling control loop (1) for a receiving circuit (2) for receiving digitally transmitted signals (s), comprising:
   a timing error detector (3) for determining respective timing error values (td) by which current symbol sampling instants (tr0 to tr3) differ from optimum symbol sampling instants (ts0 to ts3) given by the Nyquist criterion;
   an evaluating device (11) coupled to said timing error for determining at least one reliability value (v) from signals (I, Q; Is, Qs; sb, sp; st) and controls the sampling loop (1) in accordance with said at least one reliability value (v) when said at least one reliability value suffices, wherein a timing error correction value (tk) dependent on the timing error value (td) corresponds to a modulo function whose range is limited in the positive and negative directions by half a real sampling period (tr), with a number of interpolating sample values (si1, sq2) and a number of calculated timing error corrections values (tk) in a predetermined time interval ($T_{akku}$) being less than a number of real sample values (si1, sq1) and at least one real sample value (si1, sq1) being skipped in each time interval ($T_{akku}$) during timing error correction.

5. A method for receiving a transmitted signal comprising a plurality of digitally transmitted bits, said method comprising the steps of:
   receiving said digitally transmitted signal using a plurality of symbol sampling instants;
   determining respective timing error values by which each of said symbol sampling instants differ from an associated preferred symbol sampling instant;
   determining at least one reliability value (v) dependent upon said timing error values for each of said symbol sampling instants; and
   dynamically adapting said step of receiving dependent upon said at least one reliability value (v) to reduce the effects of interference on said transmitted signal when said at least one reliability value suffices;
   assigning to each of said plurality of transmitted bits a transfer function which has a non-zero signal value at a respectively associated one of said symbol sampling instants and a zero value at all other integral multiples of an associated bit period.

6. A method for receiving a transmitted signal comprising a plurality of digitally transmitted bits, said method comprising the steps of:
   receiving said digitally transmitted signal using a plurality of symbol sampling instants;
   determining respective timing error values by which each of said symbol sampling instants differ from an associated preferred symbol sampling instant;
   determining at least one reliability value (v) dependent upon said timing error values for each of said symbol sampling instants; and
   dynamically adapting said step of receiving dependent upon said at least one reliability value (v) to reduce the effects of interference on said transmitted signal when said at least one reliability value suffices;

storing a signal sequence which contains said received signal and a bit selected from said plurality of digitally transmitted bits considered sufficiently reliable only if an associated timing error value is temporally associated with a sign change of said stored signal sequence.

7. A method for receiving a transmitted signal comprising a plurality of digitally transmitted bits, said method comprising the steps of:

receiving said digitally transmitted signal using a plurality of symbol sampling instants;

determining respective timing error values by which each of said symbol sampling instants differ from an associated preferred symbol sampling instant;

determining at least one reliability value (v) dependent upon said timing error values for each of said symbol sampling instants; and dynamically adapting said step of receiving dependent upon said at least one. reliability value (v) to reduce the effects of interference on said transmitted signal when said at least one reliability value suffices;

determining a timing error correction value dependent on timing error values which correspond to a modulo function whose range is limited in the positive and negative directions by half a real sampling period, with a number of interpolated sample values and a number of calculated timing error correction values in a predetermined time interval being less than a number of real sample values, and at least one real sample value being skipped in each time interval during timing error correction.

* * * * *